(12) United States Patent
Ishizawa (10) Patent No.: US 8,388,721 B2
(45) Date of Patent: Mar. 5, 2013

(54) CERAMIC HONEYCOMB FILTER AND ITS PRODUCTION METHOD

(75) Inventor: Toshitaka Ishizawa, Moka (JP)

(73) Assignee: Hitachi Metals, Ltd., Tokyo (JP)

( * ) Notice: Subject to any disclaimer, the term of this patent is extended or adjusted under 35 U.S.C. 154(b) by 676 days.

(21) Appl. No.: 12/445,397

(22) PCT Filed: Nov. 30, 2007

(86) PCT No.: PCT/JP2007/073212
§ 371 (c)(1),
(2), (4) Date: May 20, 2009

(87) PCT Pub. No.: WO2008/066167
PCT Pub. Date: Jun. 5, 2008

(65) Prior Publication Data
US 2010/0011726 A1    Jan. 21, 2010

(30) Foreign Application Priority Data

Nov. 30, 2006    (JP) .................................. 2006-324981

(51) Int. Cl.
| | |
|---|---|
| *B01D 39/14* | (2006.01) |
| *B01D 39/06* | (2006.01) |
| *B01D 24/00* | (2006.01) |
| *B01D 50/00* | (2006.01) |
| *F01N 3/00* | (2006.01) |

(52) U.S. Cl. ............. 55/523; 55/522; 55/524; 422/169; 422/170; 422/171; 422/172; 422/177; 422/178; 422/179; 422/180; 422/181; 422/182; 60/297

(58) Field of Classification Search ............ 55/522–524; 422/169–172, 177–182; 60/297
See application file for complete search history.

(56) References Cited

U.S. PATENT DOCUMENTS

| | | | | |
|---|---|---|---|---|
| 5,194,078 A * | 3/1993 | Yonemura et al. | ............... | 55/466 |
| 5,198,007 A * | 3/1993 | Moyer et al. | .................... | 55/523 |
| 6,517,899 B1 * | 2/2003 | Hoke et al. | ................. | 427/207.1 |
| 6,818,580 B2 * | 11/2004 | Kumazawa et al. | .......... | 501/119 |
| 7,306,771 B2 * | 12/2007 | Okawara | ....................... | 422/177 |
| 7,465,690 B2 * | 12/2008 | Yan | ................ | 502/325 |
| 7,771,669 B2 * | 8/2010 | Chigapov et al. | ............. | 422/177 |

(Continued)

FOREIGN PATENT DOCUMENTS

| | | |
|---|---|---|
| CN | 1447781 A | 10/2003 |
| CN | 1680688 A | 10/2005 |

(Continued)

OTHER PUBLICATIONS

Chinese Office Action issued in Chinese Application No. 200780038033.3 dated Mar. 9, 2011.

*Primary Examiner* — Amber Orlando
(74) *Attorney, Agent, or Firm* — Sughrue Mion, PLLC (57) ABSTRACT

A ceramic honeycomb filter comprising a honeycomb structure having large numbers of flow paths partitioned by porous cell walls, and plugs alternately formed in the flow paths on the exhaust-gas-inlet and outlet sides, the area ratio of pores opening at the cell wall surfaces being 20% or more, porous, cross-linked structures being formed by heat-resistant particles introduced together with a gas into penetrating holes constituted by communicating pores in the cell walls, such that they clog the penetrating holes, and the cross-linked structures being formed more on the exhaust-gas-outlet side of the ceramic honeycomb filter than on the exhaust-gas-inlet side.

5 Claims, 5 Drawing Sheets

U.S. PATENT DOCUMENTS

| | | | |
|---|---|---|---|
| 7,981,274 B2 * | 7/2011 | Nacken et al. | 208/137 |
| 2002/0175451 A1 * | 11/2002 | Vance et al. | 264/631 |
| 2003/0166450 A1 | 9/2003 | Kumazawa et al. | |
| 2004/0053781 A1 * | 3/2004 | Okawara | 502/304 |
| 2004/0176246 A1 * | 9/2004 | Shirk et al. | 502/439 |
| 2005/0074374 A1 * | 4/2005 | Ogura | 422/180 |
| 2005/0120690 A1 * | 6/2005 | Noguchi et al. | 55/523 |
| 2005/0175514 A1 * | 8/2005 | Ohno | 422/177 |
| 2005/0191480 A1 * | 9/2005 | Tao et al. | 428/304.4 |
| 2005/0207946 A1 | 9/2005 | Asano et al. | |
| 2006/0269722 A1 * | 11/2006 | Yamada | 428/116 |
| 2006/0270816 A1 * | 11/2006 | Tao et al. | 526/317.1 |
| 2007/0039297 A1 * | 2/2007 | Kawata et al. | 55/523 |
| 2007/0065348 A1 * | 3/2007 | Ohno et al. | 422/178 |
| 2007/0119135 A1 * | 5/2007 | Miao et al. | 55/523 |
| 2007/0178025 A1 * | 8/2007 | Opris | 422/177 |
| 2007/0196248 A1 * | 8/2007 | Mizutani | 422/180 |
| 2007/0254804 A1 * | 11/2007 | Doni et al. | 502/300 |
| 2008/0110143 A1 * | 5/2008 | Chen et al. | 55/385.1 |
| 2010/0003172 A1 * | 1/2010 | Li et al. | 422/180 |

FOREIGN PATENT DOCUMENTS

| | | |
|---|---|---|
| JP | 2001-259416 A | 9/2001 |
| JP | 2002-519186 A | 7/2002 |
| JP | 2003-040687 A | 2/2003 |
| JP | 2004-074002 A | 3/2004 |
| JP | 2005-296935 A | 10/2005 |
| JP | 2006-000685 A | 1/2006 |
| JP | 2007-130629 A | 5/2007 |
| WO | 00/01463 A1 | 1/2000 |
| WO | WO2005021463 * | 5/2005 |

* cited by examiner

CERAMIC HONEYCOMB FILTER AND ITS PRODUCTION METHOD

CROSS REFERENCE TO RELATED APPLICATIONS

This application is a National Stage of International Application No. PCT/JP2007/073212 filed Nov. 30, 2007, claiming priority based on Japanese Patent Application No. 2006-324981 filed Nov. 30, 3006, the contents of all of which are incorporated herein by reference in their entirety.

FIELD OF THE INVENTION

The present invention relates to a ceramic honeycomb filter used for capturing particulate matter in an exhaust gas discharged from diesel engines, etc. to clean the exhaust gas, and its production method.

BACKGROUND OF THE INVENTION

Figure 2A:
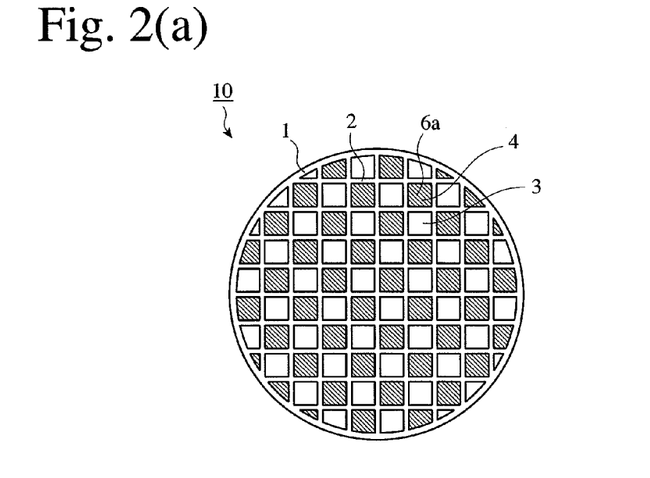
FIG. 2(a) is a schematic cross-sectional view showing one example of honeycomb filters perpendicular to its flow paths.
Figure 2B:
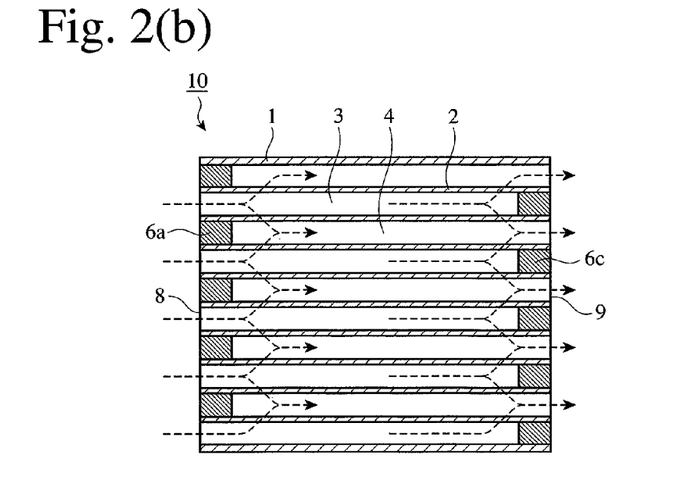
FIG. 2(b) is a schematic cross-sectional view showing one example of honeycomb filters in parallel to its flow paths.

An exhaust gas emitted from diesel engines contains PM (particulate matter) based on carbonaceous soot and SOF (soluble organic fraction) of high-boiling-point hydrocarbons. When such exhaust gas is released into the air, it may adversely affect human beings and the environment. For this reason, a PM-capturing ceramic honeycomb filter, which may be called "honeycomb filter" in short, has been disposed in an exhaust pipe connected to a diesel engine. One example of honeycomb filters for purifying an exhaust gas by removing particulate matter is shown in FIGS. 2(a) and 2(b). The honeycomb filter 10 comprises a ceramic honeycomb structure comprising porous cell walls 2 defining large numbers of outlet-side-sealed flow paths 3 and inlet-side-sealed flow paths 4 and an outer peripheral wall 1, and upstream-side plugs 6a and downstream-side plugs 6c alternately sealing the outlet-side-sealed flow paths 3 and the inlet-side-sealed flow paths 4 at an exhaust-gas-inlet-side end 8 and an exhaust-gas-outlet-side end 9 in a checkerboard pattern. The honeycomb filter is disposed in a metal container (not shown), with its outer peripheral wall 1 gripped by a holding member (not shown) constituted by a metal mesh, a ceramic mat, etc. such that the honeycomb filter used is stationary.

In the honeycomb filter 10, an exhaust gas is cleaned as follows. As shown by the dotted arrow, the exhaust gas flows into the outlet-side-sealed flow paths 3 opening at the exhaust-gas-inlet-side end 8. While it passes through the cell walls 2, specifically through penetrating holes constituted by communicating pores on and in the cell walls 2, PM contained in the exhaust gas is captured. The cleaned exhaust gas is discharged from the inlet-side-sealed flow paths 4 opening at the exhaust-gas-outlet-side end 9 into the atmosphere.

As PM continues to be captured by the cell walls 2, the penetrating holes on and in the cell walls are clogged by PM, resulting in pressure loss increase when the exhaust gas passes through the honeycomb filter. Accordingly, it is necessary to burn PM before the pressure loss reaches the predetermined level to regenerate the honeycomb filter. However, as high exhaust gas temperatures as burning PM are less obtained in a usual diesel engine operation. Accordingly, with oxidation catalysts comprising, for instance, platinum-group metals and rare earth oxides such as cerium oxide, etc. carried by alumina, a high-specific-surface-area material, integrally supported on the cell walls 2 or in the pores, catalyst-carrying honeycomb filters capable of accelerating an oxidation reaction to burn PM even at low exhaust gas temperatures have been provided for practical use. Because such catalyst-carrying honeycomb filters accelerate the burning of PM with catalysts even at relatively low exhaust gas temperatures, continuous regeneration (continuous burning and removal of PM) can be conducted in a usual diesel engine operation.

In an operation state where exhaust gas temperatures are so low that the above continuous regeneration cannot be conducted (catalysts are not activated), PM is accumulated on the cell wall surfaces and in the penetrating holes in the cell walls, resulting in the increased pressure loss of the honeycomb filter. In such a case, PM is burned with a heating means such as a heater, etc., or by adding an unburned fuel to the exhaust gas, such that the forced regeneration of the filter is conducted.

Figure 3:
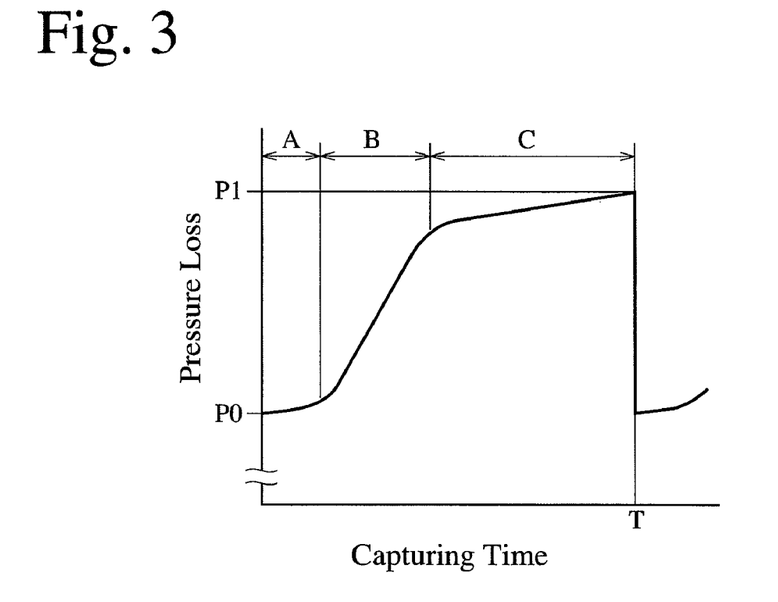
FIG. 3 is a graph schematically showing the relation between capturing time and pressure loss.

FIG. 3 shows the change of the pressure loss of a honeycomb filter with time from the start of capturing PM to the forced regeneration. The pressure loss, which is P0 at the start of capturing PM, increases as the amount of PM accumulated increases with time, and reaches a predetermined level P1, at which the forced regeneration is conducted. Because the forced regeneration consumes energy regardless of whether a heater, etc. are used or an unburned fuel is added to the exhaust gas, the time period T from the start of capturing PM to the forced regeneration is preferably as long as possible. Although the extension of the time period T can be achieved by reducing the pressure loss of the honeycomb filter by increasing the volume and average diameter of pores in the cell walls, such method causes decrease in initial PM-capturing efficiency during the period A in the figure.

To solve the above problem, JP 2006-685 A discloses a honeycomb structure in which ceramic particles are attached to cell wall surfaces to clog large open pores. It describes that this honeycomb structure less suffers capturing efficiency decrease, particularly PM-capturing efficiency decrease in an early stage, even when the volume and average diameter of pores in the cell walls are increased. As a similar technology, JP 2004-74002 A discloses a honeycomb filter having particles coated only on part of cell wall surfaces including pore openings and nearby regions to increase capturing efficiency with reduced pressure loss.

Because pores opening at the cell wall surfaces are clogged by ceramic particles in the honeycomb structure of JP 2006-685 A and the honeycomb filter of JP 2004-74002 A, PM does not easily enter pores in the cell walls but are captured on the cell wall surfaces, so that small initial PM-capturing efficiency decrease is expected. However, when PM does not easily enter pores in the cell walls, it is less brought into contact with catalysts in the pores, resulting in insufficient effect of accelerating the burning of PM. As a result, continuous regeneration is not conducted even at exhaust gas temperatures at which the catalysts are activated, so that pressure loss increases in a short period of time by PM accumulated on the cell wall surfaces, frequently needing the forced regeneration.

JP 2005-296935 A discloses an exhaust gas filter having connected agglomerates of fine particles with small gaps in pores or on the surface to have high PM-capturing efficiency in an early stage with small pressure loss. Paying attention to the fact that PM layers accumulated on the cell walls of conventional honeycomb filters are useful as filters having low pressure loss and high capturing efficiency, the exhaust gas filter described in JP 2005-296935 A was obtained by forming fine pore structures in place of the PM layers, and is considered effective for high initial PM-capturing efficiency and small pressure loss. It describes that the fine pore structures should be as thin as 3.5 μm or less to reduce pressure loss, but it is extremely difficult to form fine pore structures as thin as 3.5 μm or less with substantially spherical fine particles. Although the fine pore structures can be formed by using fibrous fine particles, the fibrous fine particles are harmful to humans, thus difficult to handle in the production process.

JP 2007-130629 A discloses an exhaust-gas-cleaning, porous filter having inner surfaces of pores coated with a heat-resistant material to form three-dimensional, cross-linked structures in the pores, thereby exhibiting a high PM-capturing ratio even without PM layers. However, because the coating of the heat-resistant material is conducted by dipping, pores opening at the cell wall surfaces are clogged to have smaller diameters, and heat-resistant particles are attached to inner surfaces of pores in the cell walls to reduce pore diameters, resulting in pressure loss increase.

OBJECT OF THE INVENTION

Accordingly, an object of the present invention is to provide an easy-to-produce honeycomb filter, which is easy to conduct continuous regeneration, and has high PM-capturing efficiency in an early stage.

DISCLOSURE OF THE INVENTION

As a result of intensive research in view of the above object, the inventors have found that the above problems can be solved not by forming the same fine pore structures as PM layers, but by forming structures in penetrating holes in the cell walls, such that the captured PM is easily accumulated on the structures to rapidly form the PM layers. The present invention has been completed based on such finding.

Thus, the honeycomb filter of the present invention comprises a honeycomb structure having large numbers of flow paths partitioned by porous cell walls, and plugs alternately formed in the flow paths on the exhaust-gas-inlet and outlet sides the area ratio of pores opening at the cell wall surfaces being 20% or more, porous, cross-linked structures being formed by heat-resistant particles introduced together with a gas into penetrating holes constituted by communicating pores in the cell walls, such that they clog the penetrating holes, and the cross-linked structures being formed more on the exhaust-gas-outlet side of the ceramic honeycomb filter than on the exhaust-gas-inlet side.

In the honeycomb filter of the present invention, the average diameter of the heat-resistant particles is preferably ⅔ times or less the average pore diameter of the cell walls, and 0.5 μm or more.

The method of the present invention for producing the above ceramic honeycomb filter is characterized by introducing the heat-resistant particles together with a gas into penetrating holes through the exhaust-gas-inlet side.

Water is preferably introduced into the penetrating holes before the heat-resistant particles are introduced into the penetrating holes together with a gas.

Only part of the flow paths on the exhaust-gas-inlet side are preferably immersed in water before the heat-resistant particles are introduced into the penetrating holes together with a gas, such that water is introduced into the penetrating holes.

DESCRIPTION OF THE PREFERRED EMBODIMENTS

Figure 4:
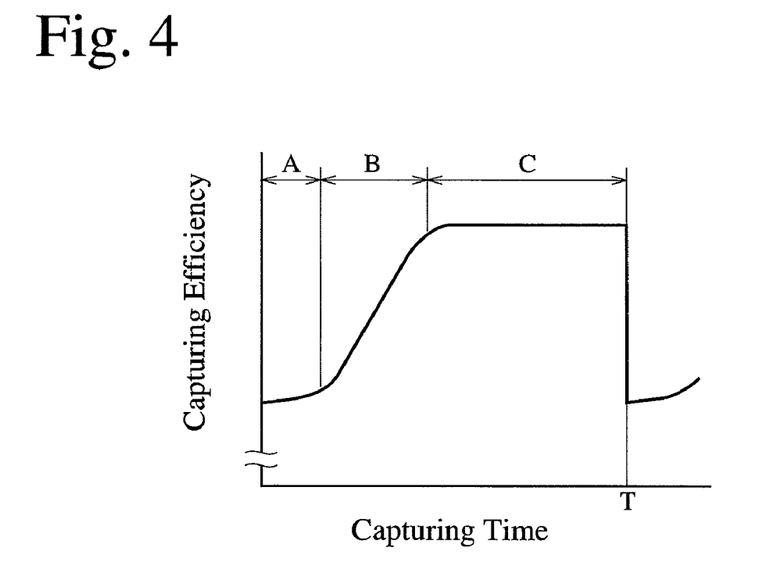
FIG. 4 is a graph schematically showing the relation between capturing time and capturing efficiency.

FIG. 3 shows the pressure loss change with time in a conventional honeycomb filter from the start of capturing PM, when an exhaust gas has a low temperature without the continuous regeneration of the honeycomb filter, and FIG. 4 shows the capturing efficiency change. Immediately after the start of capturing PM, there is a period A in which the honeycomb filter suffers small pressure loss (FIG. 3). During the period A, the capturing efficiency is also low (FIG. 4). This is because when the exhaust gas passes through penetrating holes 22 constituted by communicating pores in the cell walls, most PM 30 is not captured by pores in the cell walls, as schematically shown in FIG. 5(a).

Figure 5A:
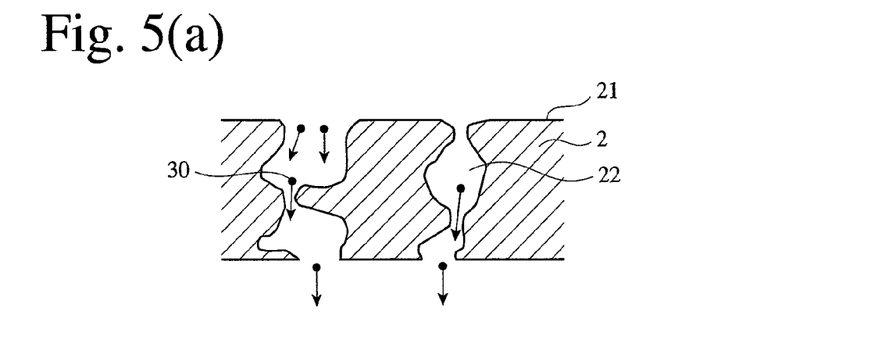
FIG. 5(a) is a schematic cross-sectional view showing a state in which PM is captured on and in the cell walls.
Figure 5B:
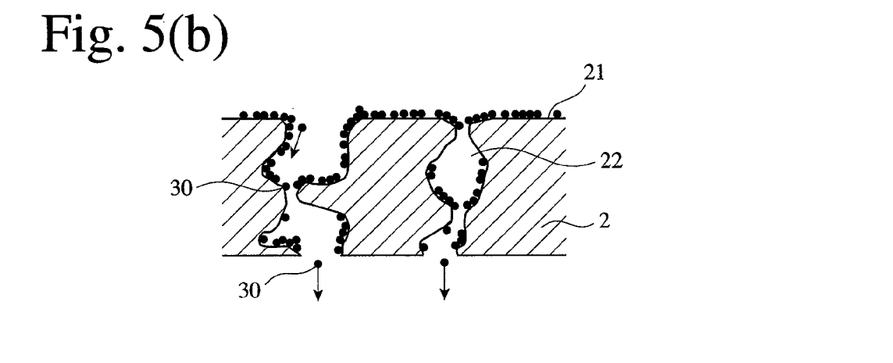
FIG. 5(b) is a schematic cross-sectional view showing another state in which PM is captured on and in the cell walls.
Figure 5C:
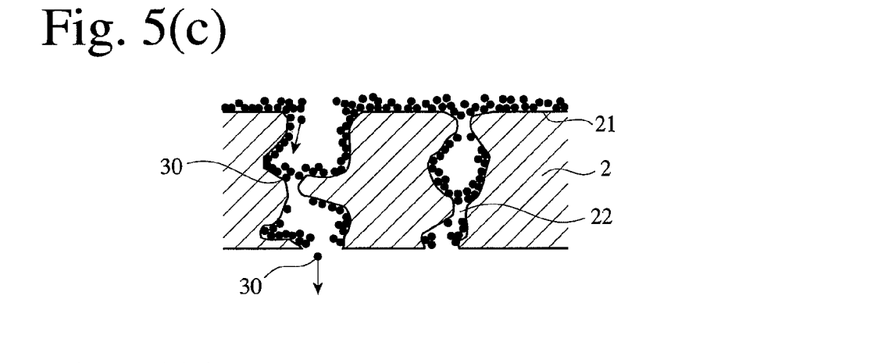
FIG. 5(c) is a schematic cross-sectional view showing a further state in which PM is captured on and in the cell walls.
Figure 5D:
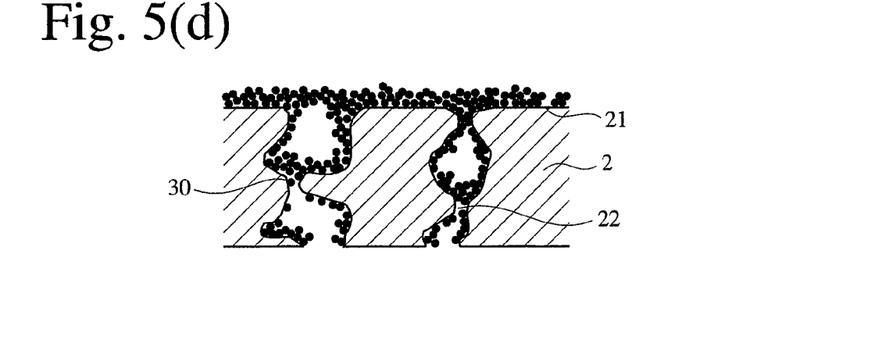
FIG. 5(d) is a schematic cross-sectional view showing a still further state in which PM is captured on and in the cell walls.

Conditions in the penetrating holes 22 change from the state shown in FIG. 5(a) to the state shown in FIG. 5(b) as the time passes. Namely, PM 30 is captured by pores in the cell walls and attached to the cell wall surfaces 21 when the exhaust gas passes through the penetrating holes 22, so that it is accumulated on the cell walls and in the pores. The accumulated PM 30 narrows the penetrating holes 22, or clogs part of the penetrating holes 22, resulting in rapidly increasing pressure loss in the period B shown in FIG. 3. Because PM 30 clogging the penetrating holes 22 acts as a PM-capturing filter, the capturing efficiency rapidly increases in the period B shown in FIG. 4. As the time goes on, a PM filter layer is more widely formed on the cell walls and in the penetrating holes 22 as shown in FIG. 5(c), large pressure loss levels off in the period C as shown in FIG. 3, and the capturing efficiency becomes substantially constant in the period C as shown in FIG. 4. As the time further goes on, PM layers grow on the cell wall surfaces as shown in FIG. 5(d), accompanied by pressure loss increase. FIG. 3 shows that the forced regeneration is conducted when the pressure loss reached P1 with a time period T from the start of capturing PM.

In conventional honeycomb filters, the volume and average diameter of pores in the cell walls are increased to lengthen the time period T until the forced regeneration is conducted. However, when the pore volume and the average pore diameter are increased, the capturing efficiency is small at the start of capturing PM, resulting in longer periods A and B having small PM-capturing efficiency.

Figure 1:
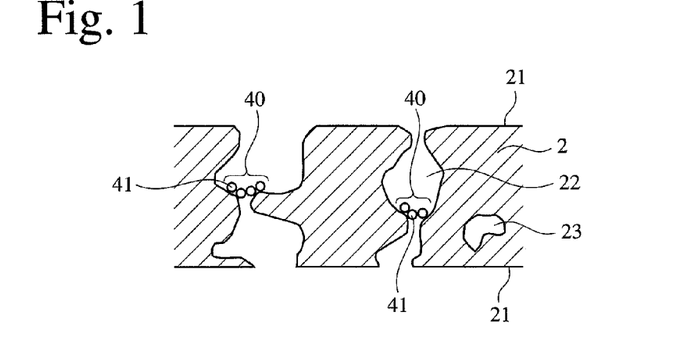
FIG. 1 is a schematic cross-sectional view showing the cell walls of the honeycomb filter of the present invention.
Figure 6:
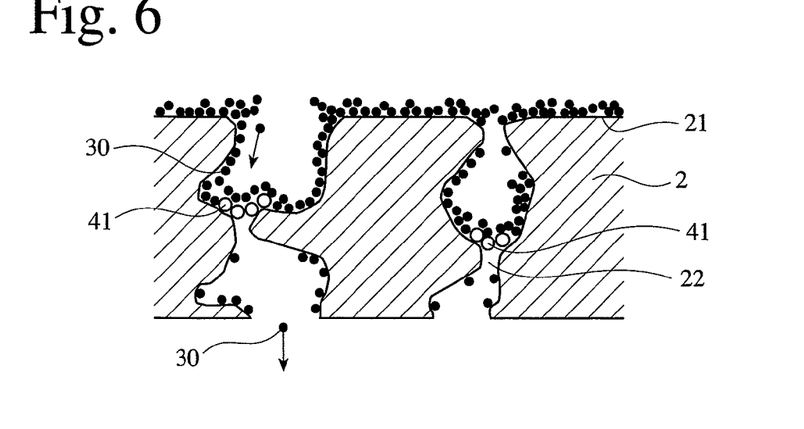
FIG. 6 is a schematic cross-sectional view showing the cell walls of the honeycomb filter of the present invention on which PM is captured.

In the honeycomb filter of the present invention, porous, cross-linked structures 40 formed by heat-resistant particles 41 introduced together with a gas into the penetrating holes 22 constituted by communicating pores in the cell walls 2 through the exhaust-gas-inlet-side end 8 clog the penetrating holes 22 as shown in FIG. 1. With PM 30 attached to the cross-linked structures 40, filter layers of PM 30 are formed early in the penetrating holes 22 as shown in FIG. 6, and the filter layers become as shown in FIG. 5(c). As a result, the periods A and B shown in FIGS. 3 and 4 become shorter, resulting in high PM-capturing efficiency even in an early stage.

Figure 8:
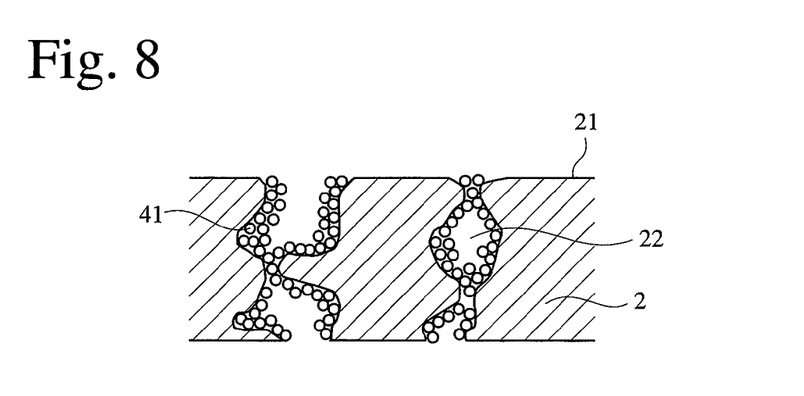
FIG. 8 is a schematic cross-sectional view showing penetrating holes in the cell walls, into which a dispersion of heat-resistant particles is introduced.

The heat-resistant particles 41 should be introduced together with a gas. For instance, when a dispersion liquid of heat-resistant particles is introduced into the penetrating holes 22, the heat-resistant particles 41 are attached to the entire inner surfaces of the penetrating holes 22 as shown in FIG. 8, thereby narrowing the penetrating holes 22, and thus increasing the pressure loss of the honeycomb filter.

The cross-linked structures are preferably formed more on the exhaust-gas-outlet side of the ceramic honeycomb filter than the exhaust-gas-inlet side. When PM contained in the exhaust gas enters the flow paths 3 through the exhaust-gas-inlet-side end 8, inertia makes PM enter more pores near the exhaust-gas-outlet-side end 9 than those near the exhaust-gas-inlet-side end 8. Thus, with more cross-linked structures formed on the exhaust-gas-outlet side, PM is more efficiently captured. To form the cross-linked structures more on the exhaust-gas-outlet side of the ceramic honeycomb filter than on the exhaust-gas-inlet side, the heat-resistant particles are preferably introduced together with a gas into the flow paths 3 through the exhaust-gas-inlet-side end 8. Thus, inertia makes the heat-resistant particles enter more pores near the exhaust-gas-outlet-side end 9 like PM, so that more cross-linked structures can be formed on the exhaust-gas-outlet side.

Figure 7:
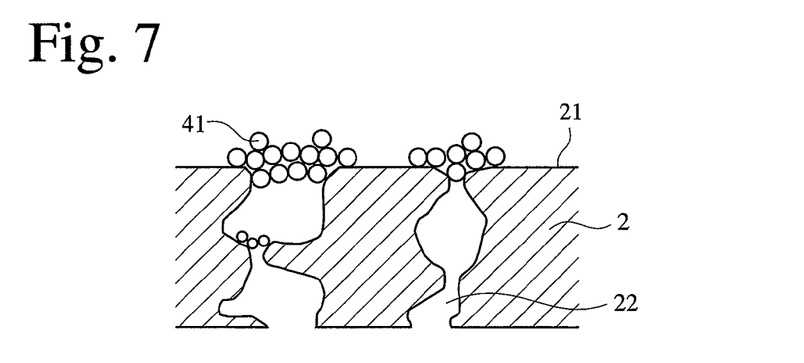
FIG. 7 is a schematic cross-sectional view showing cross-linked structures formed on the cell wall surfaces.

The above cross-linked structures 40 should be formed more in the penetrating holes 22 than on the cell wall surfaces 21. As little cross-linked structures as possible are preferably formed on the cell wall surfaces 21. When the cross-linked structures 40 are formed on the cell wall surfaces 21 as shown in FIG. 7, there is a small area ratio of pores opening at the cell wall surfaces 21, so PM does not easily enter pores in the cell walls. Thus, the continuous regeneration is likely hindered as in the honeycomb filters described in JP 2006-685 A and JP 2004-74002 A. With the percentage of the cross-linked structures 40 on the cell wall surfaces 21 limited as low as possible, and the area ratio of pores opening at the cell wall surfaces 21 limited to 20% or more, continuous regeneration rapidly proceeds in the honeycomb filter of the present invention. Though not particularly restricted, the upper limit of the area ratio of pores opening at the cell wall surfaces 21 is preferably 60%. When it is more than 60%, the honeycomb filter has low strength.

The average diameter of the heat-resistant particles 41 constituting the cross-linked structures 40 is preferably ⅔ times or less the average pore diameter of the cell walls 2, and 0.5 µg/m or more. When the average diameter of the heat-resistant particles 41 is more than ⅔ times the average pore diameter, the heat-resistant particles 41 do not easily enter the penetrating holes 22, so that the cross-linked structures are formed on pore openings on the cell wall surfaces 21 as shown in FIG. 7, hindering the continuous regeneration. The average diameter of the heat-resistant particles 41 is more preferably less than ½ times the average pore diameter of the cell walls 2. On the other hand, when the average diameter of the heat-resistant particles constituting the cross-linked structures is less than 0.5 µm, the cross-linked structures 40 have relatively small porosity, providing the honeycomb filter with large pressure loss. In addition, when the heat-resistant particles enter the penetrating holes from the cell wall surfaces, most heat-resistant particles pass through the penetrating holes, taking a long period of time to form cross-linked structures in the penetrating holes. The average diameter of the heat-resistant particles constituting the cross-linked structures is more preferably 1 µm or more. To achieve both pressure loss reduction and capturing efficiency improvement, the average pore diameter of the cell walls 2 is preferably 15-30 µm.

Materials for the heat-resistant particles 41 constituting the cross-linked structures 40 are preferably those not decomposed by high temperatures when PM is burned, and having high thermal shock resistance, specifically cordierite, silicon carbide and aluminum titanate. Particularly preferable are the same materials as those of the cell walls 20 because of the same thermal expansion coefficient between the cell walls 20 and the cross-linked structures 40. The heat-resistant particles 41 are preferably substantially spherical, having aspect ratios of 1-5. When the heat-resistant particles 41 are fibrous, columnar or needle-like, and when their materials are ceramics such as cordierite, silicon carbide, aluminum titanate, etc., their adverse influence on humans are not negated, making it difficult to handle them in the production process. The more preferred aspect ratio range is 1-2.

The cross-linked structures are preferably formed selectively in penetrating holes having relatively large diameters, but as little as possible in penetrating holes having small diameters. Such structures can suppress the pressure loss increase of the honeycomb filter, thereby increasing the PM-capturing efficiency. Such structures can be formed by introducing water into the penetrating holes, and then introducing the heat-resistant particles together with a gas. When a gas is caused to pass through the honeycomb filter in a state where there is water in the penetrating holes, the gas passes through the penetrating holes, pushing water in the penetrating holes out of the cell walls. Water is more easily pushed out of larger-diameter penetrating holes, so that the gas selectively passes through larger-diameter penetrating holes. Accordingly, the heat-resistant particles contained in this gas are also introduced selectively into the larger-diameter penetrating holes, so that the cross-linked structures are formed selectively in the larger-diameter penetrating holes.

Further, with only the flow paths on the exhaust-gas-inlet side immersed in water, water is introduced only into pores in the cell walls near the exhaust-gas-inlet-side end, while pores in the cell walls near the exhaust-gas-outlet-side end are not filled with water. When the heat-resistant particles are introduced together with a gas into the honeycomb filter in this state, more cross-linked structures are formed in pores in the cell walls near the exhaust-gas-outlet-side end, effectively capturing PM.

The present invention will be explained in further detail by Examples below without intention of restricting the present invention thereto.

EXAMPLE 1

Production of Honeycomb Filter

To produce the honeycomb filter 10 shown in FIG. 2 by a known method, kaolin powder, talc powder, silica powder, alumina powder and aluminum hydroxide powder were mixed to prepare cordierite-forming material powder comprising 50% by mass of $SiO_2$, 35% by mass of $Al_2O_3$ and 15% by mass of MgO. The amounts of these components may be adjusted in a range of 48-52% for $SiO_2$, 33-37% for $Al_2O_3$ and 12-15% for MgO. This powder was mixed with methylcellulose and hydroxypropyl methylcellulose as binders, a lubricant, and a foamed resin as pore formers. After thorough dry-blending, water was added to carry out sufficient kneading to prepare a moldable ceramic material. This moldable material was extrusion-molded and cut to a honeycomb-structure, molded article. This molded article was dried and sintered to produce a cordierite honeycomb structure. This honeycomb structure was provided with plugs 6a, 6c in end portions of flow paths 3, 4 to obtain the honeycomb filter 10, which had a length of 360 mm, an outer diameter of 300 mm, a cell wall thickness of 0.3 mm, a cell wall pitch of 1.5 mm.

Formation of Cross-Linked Structures

Air containing heat-resistant particles (substantially spherical cordierite powder having an average aspect ratio of 1.2) having the average diameter shown in Table 1 was supplied to the honeycomb filter 10 through the exhaust-gas-inlet-side end 8 at a flow rate of 8 $Nm^3$/min for 5 minutes, and discharged from the exhaust-gas-outlet-side end 9 to form cross-linked structures in the penetrating holes of the cell walls 2. The honeycomb filter 10 supplied with the heat-resistant particles was sintered at 1300° C. for 3 hours to fix the cross-linked structures to the surfaces of the penetrating holes. Thereafter, an outer peripheral wall 1 was formed.

Carrying Catalyst

A platinum catalyst was carried by the honeycomb filter 10 at a ratio of 1.5 g/L (1.5 g of platinum per 1 L of the honeycomb filter), by uniformly applying a coating material comprising platinum and active alumina to the entire cell walls.

Measurement of Average Pore Diameter and Porosity

Four identical honeycomb filters were produced under the above conditions, and one of them was measured with respect to an average pore diameter and porosity by mercury intrusion porosimetery.

Measurement of Opening Area Ratio of Pores

The opening area ratio of pores on the surface 21 of the cell walls 2 in the outlet-side-sealed flow paths 3 near the exhaust-gas-outlet-side end 9 was determined by the image analysis of a SEM photograph (magnification: 100 times).

Measurement of Mass Difference Between Downstream Side and Upstream Side

Cubic test pieces of 100 mm in each side were cut out of one of the remaining honeycomb filters on both upstream and downstream sides, and their mass was measured to determine mass difference [(mass of test piece on downstream side)−(mass of test piece on upstream side)]. When this value is larger, the cross-linked structures are formed more on the downstream side than on the upstream side.

Measurement of Initial Pressure Loss and Capturing Efficiency

Using one remaining honeycomb filter, initial pressure loss and capturing efficiency were measured. Air was supplied to the honeycomb filter through the exhaust-gas-inlet-side end 8 at a flow rate of 10 $Nm^3$/min to measure the initial pressure loss. 25 g/h of carbon powder having a particle size of 0.042 μm, which was generated by a fine particle generator, was supplied together with air at a flow rate of 10 $Nm^3$/min to the above pressure-loss-measured honeycomb filter through the exhaust-gas-inlet-side end 8, and the number of carbon particles flowing into the honeycomb filter and the number of carbon particles flowing out of the honeycomb filter were counted every one minute by TSI Model 3936 (SMPS, scanning mobility particle sizer). Capturing efficiency was calculated from the formula of (Nin−Nout)/Nin, wherein Nin represents the number of carbon particles flowing into the honeycomb filter, and Nout represents the number of carbon particles flowing out of the honeycomb filter, in a time period from 20 minutes to 21 minutes after the start of flowing.

Evaluation of Continuous Regeneration

Using one remaining honeycomb filter, the progress of continuous regeneration was elevated. 25 g/h of carbon powder having a particle size of 0.042 μm, which was generated by a particle generator, was introduced into the honeycomb filter through the exhaust-gas-inlet-side end 8 together with air at 600° C. and at a flow rate of 10 $Nm^3$/min for 2 hours. The pressure loss of the honeycomb filter at this time (pressure loss 2 h) was measured, and the pressure loss after supplying carbon powder under the same conditions for 2 hours (pressure loss 4 h) was further measured. When the value of (pressure loss 4 h/pressure loss 2 h) is nearly 1, continuous regeneration well proceeds, and when this value is larger than 1.1, continuous regeneration does not well proceed.

With respect to the honeycomb filter of Example 1, an average pore diameter, porosity, an opening area ratio of pores, mass difference between the downstream side and the upstream side, initial pressure loss, capturing efficiency, and (pressure loss 4 h/pressure loss 2 h) are shown in Table 1. The initial pressure loss is expressed by a relative value assuming that Example 1 was 100. In the honeycomb filter of Example 1, the value of (pressure loss 4 h/pressure loss 2 h) was nearly 1, indicating that the continuous regeneration proceeded.

COMPARATIVE EXAMPLE 1

A honeycomb filter was produced in the same manner as in Example 1, except for forming no cross-linked structures in the penetrating holes in the cell walls 2 (a heat-resistant-particles-supplying step and a subsequent sintering step were not conducted). Using this honeycomb filter, an average pore diameter, porosity, an opening area ratio of pores, mass difference between the downstream side and the upstream side, initial pressure loss (expressed by a relative value assuming that Example 1 was 100), capturing efficiency, and (pressure loss 4 h/pressure loss 2 h) were measured in the same manner as in Example 1. The results are shown in Table 1.

Figure 9:
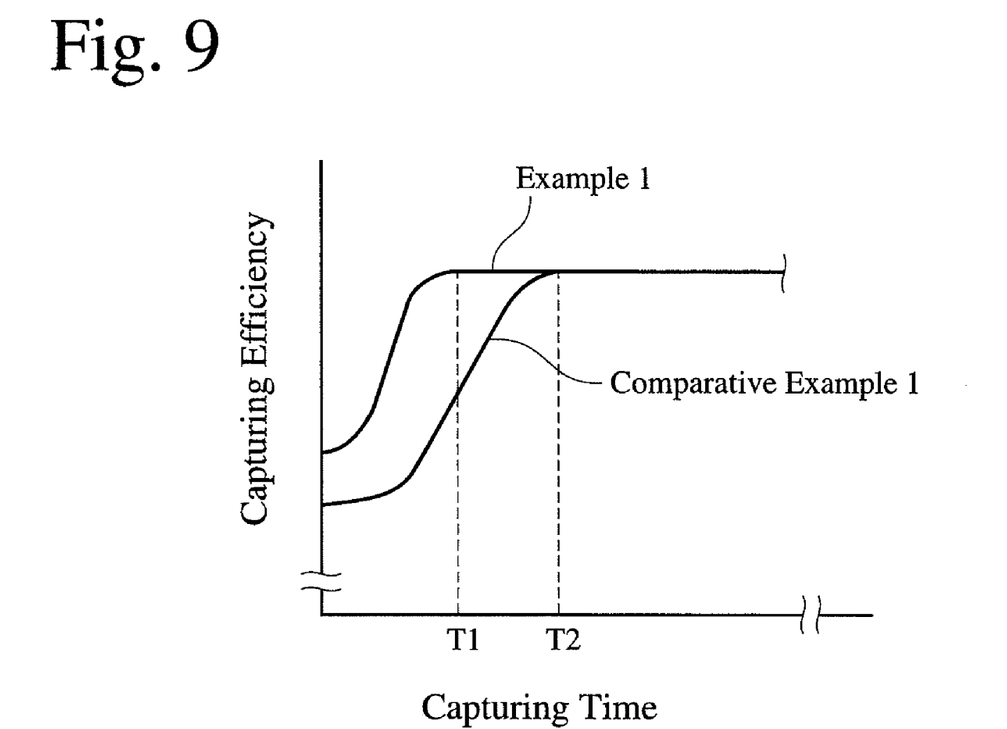
FIG. 9 is a graph showing the relation between capturing time and pressure loss in the honeycomb filters of Example 1 and Comparative Example 1.

FIG. 9 shows the change of capturing efficiency with time. The time periods T1 and T2, with which the honeycomb filters of Example 1 and Comparative Example 1 became to have substantially constant capturing efficiency, were 30 minutes and 60 minutes, respectively, after the start of supplying carbon powder. The honeycomb filter of Example 1 suffered less decrease in PM-capturing efficiency in an early stage than the conventional honeycomb filter of Comparative Example 1.

EXAMPLES 2-7 AND COMPARATIVE EXAMPLE 2

A honeycomb filter was produced in the same manner as in Example 1, except for changing the particle size of heat-resistant particles introduced into the penetrating holes in the cell walls 2 as shown in Table 1. With respect to these honeycomb filters, an average pore diameter, porosity, an opening area ratio of pores, mass difference between the downstream side and the upstream side, initial pressure loss (expressed by a relative value assuming that Example 1 was 100), capturing efficiency, and (pressure loss 4 h/pressure loss 2 h) were measured in the same manner as in Example 1. The results are shown in Table 1.

It is clear from Table 1 that the honeycomb filters of Examples 1-7 (within the present invention) each having cross-linked structures of heat-resistant particles having an opening area ratio of pores of 20% or more and closing penetrating holes in the cell walls 2 had as high capturing efficiency as 99.0% or more, and as small (pressure loss 4 h/pressure loss 2 h) as 1.07 or less. On the other hand, the honeycomb filter of Comparative Example 1 without cross-linked structures in penetrating holes had as low capturing efficiency as 95.2%. The honeycomb filter of Comparative Example 2, in which the area ratio of pores opening at the cell wall surfaces 21 was less than 20%, had as large (pressure loss 4 h/pressure loss 2 h) as 1.23. It is thus clear from above that continuous regeneration is efficiently conducted in the honeycomb filters of the present invention, resulting high PM-capturing efficiency in an early stage. Particularly, because heat-resistant particles constituting the cross-linked structures had an average diameter of less than ⅔ of the average pore diameter of the cell walls and 0.5 μm or more, the honeycomb filters of Examples 1 and 3-6 met both requirements of low pressure loss and high capturing efficiency.

flow rate of air to 4 Nm$^3$/min and 21 Nm$^3$/min, respectively, when introducing heat-resistant particles into the honeycomb filter. The honeycomb filter of Comparative Example 3 was produced in the same manner as in Example 1, except for introducing air through the exhaust-gas-outlet-side end 9 when introducing heat-resistant particles into the honeycomb filter. With respect to these honeycomb filters, an average pore diameter, porosity, an opening area ratio of pores, mass difference between the downstream side and the upstream side, initial pressure loss (expressed by a relative value assuming that Example 1 was 100), capturing efficiency, and (pressure loss 4 h/pressure loss 2 h) were measured in the same manner as in Example 1. Because their average pore diameters, porosity and opening area ratios of pores were the same as those of the honeycomb filter of Example 1, they are omitted. The other measurement results are shown in Table 2.

It is clear from Examples 1, 8 and 9 that a larger flow rate of air provided larger mass difference between the down-

TABLE 1

| No. | Average Pore Diameter N (μm) | Porosity (%) | Area Ratio of Pores Opening at Cell Wall Surfaces (%) | Average Diameter M of Heat-Resistant Particles (μm) | M/N |
|---|---|---|---|---|---|
| Example 1 | 22 | 51 | 25 | 7 | 0.32 |
| Comparative Example 1 | 23 | 56 | 29 | — | — |
| Example 2 | 20 | 50 | 28 | 0.3 | 0.02 |
| Example 3 | 20 | 51 | 27 | 0.5 | 0.03 |
| Example 4 | 20 | 50 | 27 | 1 | 0.05 |
| Example 5 | 22 | 52 | 26 | 5 | 0.23 |
| Example 6 | 21 | 50 | 21 | 10 | 0.48 |
| Example 7 | 21 | 50 | 20 | 14 | 0.67 |
| Comparative Example 2 | 21 | 49 | 18 | 17 | 0.81 |

| No. | Mass Difference[1] (Downstream Side − Upstream Side) (g) | Initial Pressure Loss[2] | Capturing Efficiency[3] | Pressure Loss 4 h/ Pressure Loss 2 h |
|---|---|---|---|---|
| Example 1 | 0.8 | 100 | 99.2 | 1.01 |
| Comparative Example 1 | 0 | 88 | 95.2 | 1.01 |
| Example 2 | 0.7 | 110 | 99.5 | 1.01 |
| Example 3 | 0.7 | 106 | 99.5 | 1.03 |
| Example 4 | 0.7 | 104 | 99.4 | 1.01 |
| Example 5 | 0.8 | 96 | 99.3 | 1.02 |
| Example 6 | 0.8 | 102 | 99.2 | 1.04 |
| Example 7 | 0.9 | 108 | 99.0 | 1.07 |
| Comparative Example 2 | 0.9 | 120 | 99.1 | 1.23 |

Note:
[1]Mass difference in test pieces cut out of the honeycomb filter on both upstream and downstream sides (downstream side − upstream side).
[2]Expressed by a relative value assuming that Example 1 was 100.
[3]Capturing efficiency in a time period from 20 minutes to 21 minutes after the start of flowing.

EXAMPLES 8 AND 9, AND COMPARATIVE EXAMPLE 3

The honeycomb filters of Examples 8 and 9 were produced in the same manner as in Example 1, except for changing the stream side and the upstream side, resulting in cross-linked structures formed more on the downstream side, and thus increase in capturing efficiency. The cross-linked structures were formed more on the upstream side in Comparative Example 3, resulting in reduced capturing efficiency.

TABLE 2

| No. | Air Flow Rate[1] (m³/min) | Mass Difference[2] (Downstream Side – Upstream Side) (g) | Initial Pressure Loss[3] | Capturing Efficiency[4] | Pressure Loss 4 h/ Pressure Loss 2 h |
|---|---|---|---|---|---|
| Example 1 | 8 | 0.8 | 100 | 99.2 | 1.01 |
| Example 8 | 4 | 0.5 | 99 | 98.6 | 1.01 |
| Example 9 | 21 | 1.2 | 101 | 99.4 | 1.01 |
| Comp. Ex. 3 | 8[5] | −0.8 | 98 | 95.9 | 1.03 |

Note:
[1]The flow rate of air when introducing heat-resistant particles into the honeycomb filter.
[2]Mass difference in test pieces cut out of the honeycomb filter on both upstream and downstream sides (downstream side − upstream side).
[3]Expressed by a relative value assuming that Example 1 was 100.
[4]Capturing efficiency in a time period from 20 minutes to 21 minutes after the start of flowing.
[5]Heat-resistant particles were supplied to the honeycomb filter in an opposite direction to that in Example 1.

EXAMPLES 10 AND 11

The honeycomb filter of Example 10 was produced in the same manner as in Example 1, except that the entire honeycomb filter was immersed in water before heat-resistant particles were supplied thereto together with air through the exhaust-gas-inlet-side end 8. The honeycomb filter of Example 11 was produced in the same manner as in Example 10, except that only half of the honeycomb filter on the exhaust-gas-inlet side was immersed in water. With respect to these honeycomb filters, an average pore diameter, porosity, an opening area ratio of pores, mass difference between the downstream side and the upstream side, initial pressure loss (expressed by a relative value assuming that Example 1 was 100), capturing efficiency, and (pressure loss 4 h/pressure loss 2 h) were measured in the same manner as in Example 1. The results are shown in Table 3. The honeycomb filters of Examples 10 and 11 had improved capturing efficiency than that of Example 1, though their initial pressure losses were on the same level.

TABLE 3

| No. | Average Pore Diameter N (μm) | Porosity (%) | Area Ratio of Pores Opening at Cell Wall Surfaces (%) | Average Diameter M of Heat-Resistant Particles (μm) | M/N |
|---|---|---|---|---|---|
| Example 1 | 22 | 51 | 25 | 7 | 0.32 |
| Example 10 | 19 | 52 | 26 | 7 | 0.37 |
| Example 11 | 20 | 51 | 24 | 7 | 0.35 |

| No. | Mass Difference[1] (Downstream Side – Upstream Side) (g) | Initial Pressure Loss[2] | Capturing Efficiency[3] | Pressure Loss 4 h/ Pressure Loss 2 h |
|---|---|---|---|---|
| Example 1 | 0.8 | 100 | 99.2 | 1.01 |
| Example 10 | 0.8 | 99 | 99.6 | 1.02 |
| Example 11 | 1.2 | 101 | 99.5 | 1.01 |

Note:
[1]Mass difference in test pieces cut out of the honeycomb filter on both upstream and downstream sides (downstream side − upstream side).
[2]Expressed by a relative value assuming that Example 1 was 100.
[3]Capturing efficiency in a time period from 20 minutes to 21 minutes after the start of flowing.

EFFECT OF THE INVENTION

Because the honeycomb filter of the present invention has high PM-capturing efficiency in an early stage and high resistance to pressure loss increase, and is efficient in continuous regeneration, it can be used for a long period of time until the forced regeneration is conducted. The method of the present invention can efficiently form porous, cross-linked structures in the cell walls of the honeycomb filter on the downstream side.

What is claimed is:

1. A ceramic honeycomb structure having large numbers of flow paths partitioned by porous cell walls, and plugs alternately formed in said flow paths on the exhaust-gas-inlet and outlet sides, an area ratio of pores opening at the cell wall surfaces being 20-28%, porous, cross-linked structures being formed by heat-resistant particles introduced together with a gas into penetrating holes constituted by communicating pores in said cell walls, such that they clog said penetrating holes, and said cross-linked structures being formed more on the exhaust-gas-outlet side of said ceramic honeycomb filter than on the exhaust-gas-inlet side wherein said heat-resistant particles are the same material as that of said cell walls.

2. The ceramic honeycomb filter according to claim 1, wherein the average diameter of said heat-resistant particles is 2/3 times or less the average pore diameter of said cell walls, and 0.5 μm or more.

3. A method for producing the ceramic honeycomb filter recited in claim 1, wherein said heat-resistant particles are introduced together with a gas through said exhaust-gas-inlet side.

4. A method for producing the ceramic honeycomb filter recited in claim 1, wherein water is introduced into said penetrating holes before said heat-resistant particles are introduced into said penetrating holes together with a gas.

5. The method for producing a ceramic honeycomb filter according to claim 3, wherein only part of said flow paths on the exhaust-gas-inlet side is immersed in water before said heat-resistant particles are introduced, such that water is introduced into said penetrating holes.

* * * * *